United States Patent
Hicks, III et al.

(10) Patent No.: US 8,613,011 B2
(45) Date of Patent: Dec. 17, 2013

(54) SERVICES GATEWAY VIDEO-ON-DEMAND SERVICE

(75) Inventors: John Alson Hicks, III, Roswell, GA (US); Nicholas S. Huslak, Johns Creek, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 337 days.

(21) Appl. No.: 12/842,758

(22) Filed: Jul. 23, 2010

(65) Prior Publication Data

US 2012/0023519 A1  Jan. 26, 2012

(51) Int. Cl.
*H04N 7/167* (2011.01)

(52) U.S. Cl.
USPC .............. 725/31; 725/61; 725/87; 725/100; 725/110; 725/111; 725/93

(58) Field of Classification Search
USPC .......... 725/31, 61, 87, 100, 110, 111, 93, 109
See application file for complete search history.

(56) References Cited

U.S. PATENT DOCUMENTS

| | | | |
|---|---|---|---|
| 7,039,938 B2 | 5/2006 | Candelore | |
| 7,209,945 B2 | 4/2007 | Hicks, III et al. | |
| 7,336,784 B2 | 2/2008 | Zuili | |
| 7,698,723 B2 | 4/2010 | Hicks, III et al. | |
| 2004/0148408 A1 | 7/2004 | Nadarajah | |
| 2004/0254999 A1 | 12/2004 | Bulleit et al. | |
| 2005/0177853 A1* | 8/2005 | Williams et al. | 725/81 |
| 2006/0123246 A1 | 6/2006 | Vantalon et al. | |
| 2009/0282432 A1 | 11/2009 | Hahnefeld et al. | |
| 2010/0281508 A1* | 11/2010 | Poder et al. | 725/93 |
| 2010/0319017 A1* | 12/2010 | Cook | 725/31 |

* cited by examiner

*Primary Examiner* — Jivka Rabovianski
(74) *Attorney, Agent, or Firm* — Guntin & Gust, PLC; Douglas Schnabel (57) ABSTRACT

A services gateway includes a processor configured to send a request for a video-on-demand content, receive a first content stream from a video-on-demand content server, and process the first content stream to retrieve the video-on-demand content. The first content stream includes the video-on-demand content and is protected with a first digital rights management scheme. The processor is further configured to encode the video-on-demand content in a second content stream, and provide the second content stream over a local area network to a playback device. The second content stream is protected with a second digital rights management scheme. In an embodiment, the processor can be further configured to store the video-on-demand content in a mass storage.

18 Claims, 4 Drawing Sheets

SERVICES GATEWAY VIDEO-ON-DEMAND SERVICE

FIELD OF THE DISCLOSURE

The present disclosure generally relates to communications networks, and more particularly relates to a services gateway video-on-demand service.

BACKGROUND

A television service provider can transmit a television signal, such as through an Internet Protocol Television (IPTV) network or a cable network, to a user. The television service provider can offer the user a variety of different content and services. For example, the television service provider can supply users with real-time television programs that are typically available for the users to watch only at a specific date and time. The user may record the real-time television programs, such as with a digital video recorder (DVR). If the content is recorded at the specific date and time when the real-time television program is provided, the user can view the program at a time of their choosing.

The television service provider can also offer the users on-demand content that is available for an extended amount of time. The on-demand content can allow a user to view a program at a time of their choosing and can be provided to the user upon request. On-demand content can be provided via video streaming wherein video content is streamed from a server in the network across the network for display on a TV in the home or on-demand content can be downloaded via streaming or file transfer to a storage device in the home and then displayed on a TV or streamed over the home network to a TV.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
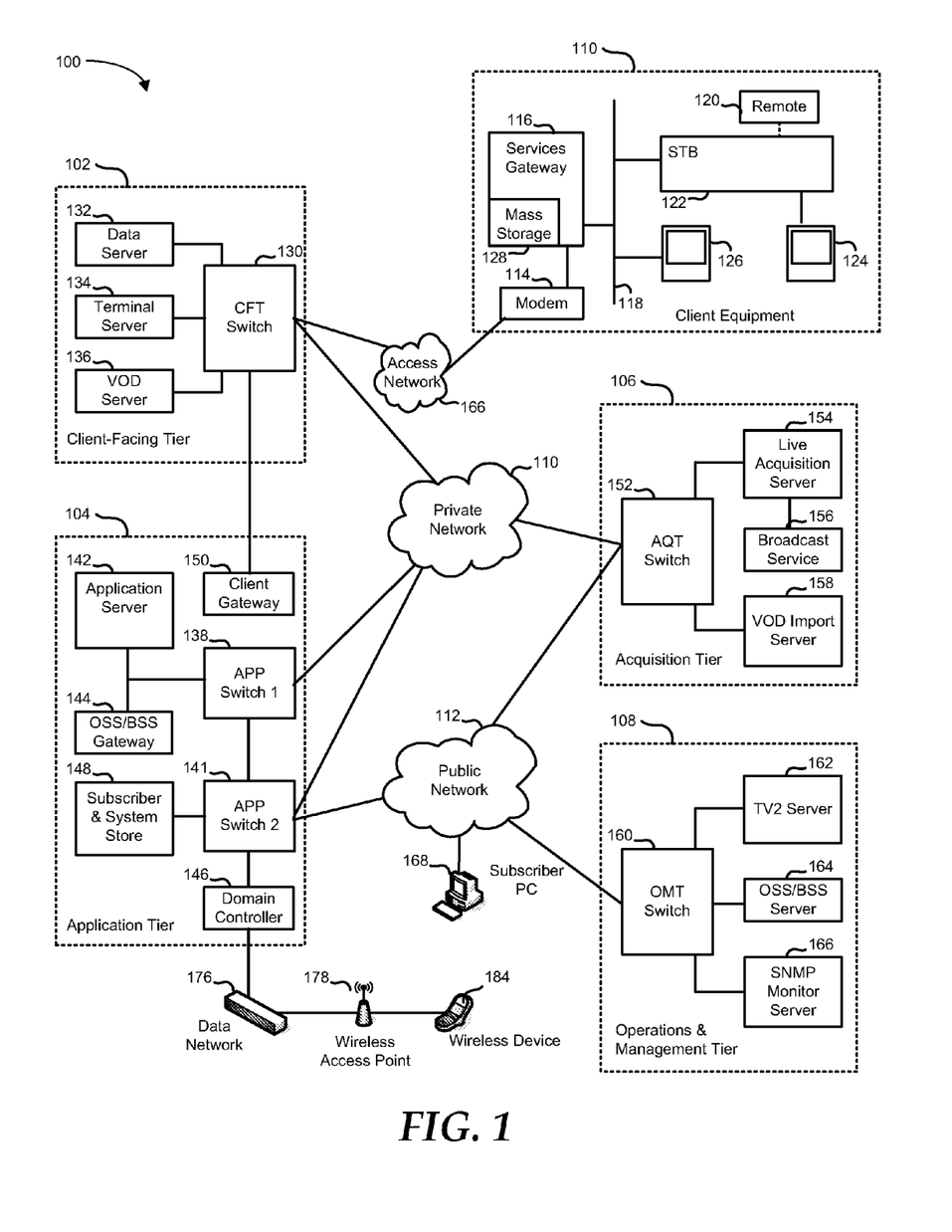
FIG. 1 is a block diagram illustrating an Internet Protocol Television (IPTV) network in accordance with one embodiment of the present disclosure.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, a modem 114 can be coupled to the private access network 166. The client-facing tier 102 can communicate with a services gateway 116 via the modem 114. In an alternate embodiment, the functionality of modem 114 can be incorporated into the services gateway 116 and the services gateway 116 can communicate directly with the access network 166. The client-facing tier 102 can communicate with a large number of services gateways over a wide geographic area, such as a regional area, a metropolitan area, a viewing area, or any other suitable geographic area that can be supported by networking the client-facing tier 102 to numerous services gateways. In one embodiment, the client-facing tier 102 can be coupled to the modem 114 via fiber optic cables. Alternatively, the modem 114 can be digital subscriber line (DSL) modems that are coupled to one or more network nodes via twisted pairs, and the client-facing tier 102 can be coupled to the network nodes via fiber-optic cables. The services gateway 116 can process data received from the private access network 166 via an IPTV software platform such as Microsoft® TV IPTV Edition.

The services gateway 116 can communicate with a set-top box device 122 through a local network 118. The first set-top box device 122 can be coupled to a first display device 124, such as a television monitor. In an embodiment, the set-top box device 122 can be a DLNA extender. Additionally, a second display device 126, such as a network enabled television monitor, can communicate with the services gateway 120 through the local network 118. Moreover, the set-top box device 122 can communicate with a first remote control 120. In an exemplary, non-limiting embodiment, the services gateway 116 can receive data or video from the client-facing tier 102 via the private access network 166 and render and stream the data or video to the set-top box 122 or the display device 126. The set-top box 122 can display the data or video on the display device 124. In a particular embodiment, the set-top box device 122 can also communicate commands received from the remote control 120 back to the services gateway 116.

In an embodiment, the services gateway 116 can include a mass storage module 128. Alternatively, the mass storage module 128 can be a separate device coupled to the services gateway 116. The services gateway 116 can utilize the mass storage module 128 for storage of content, such as VOD content. The services gateway 116 can provide access to the content stored within the mass storage module 128 for display on display devices 124 and 126.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the services gateway 116, the request can be transmitted over the private access network 166 to the VOD server 136 via the CFT switch 130. Upon receiving such a request, the VOD server 136 can retrieve requested VOD content and transmit the VOD content to the services gateway 116 across the private access network 166 via the CFT switch 130. The services gateway can store the VOD content within the mass storage module 128 and can provide the content to display devices 124 and 126. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

Figure 2:
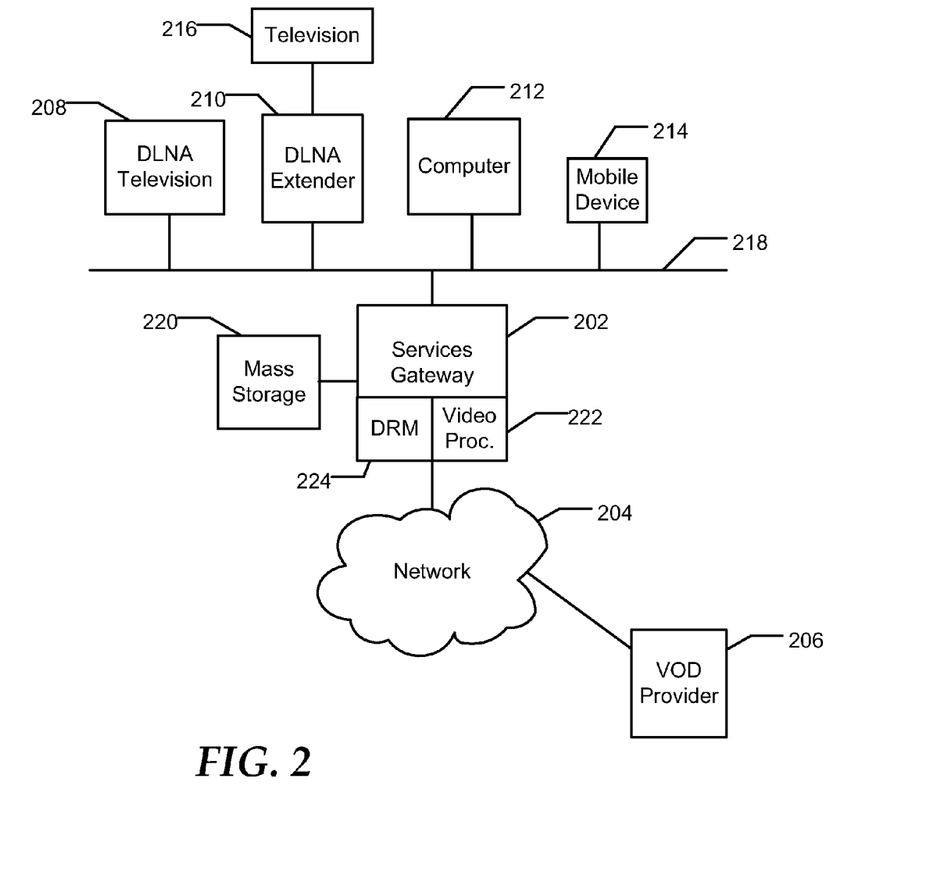
FIG. 2 is a block diagram illustrating a content distribution network in accordance with one embodiment of the present disclosure.

FIG. 2 shows a VOD content distribution system 200 that can be used in conjunction with IPTV system 100. VOD content distribution system 200 can include a services gateway 202. The services gateway 202 can communicate through a wide-area network (WAN) 204, such as public network 112 or private network 110, with a VOD provider 206. In an embodiment, the services gateway 202 can communicate with the WAN 204 using a DSL connection, a cable television network, a wireless network, a satellite network, a cellular network, or any combination thereof. The services gateway 202 can include hardware to connect directly to the WAN 204, or can communicate with the WAN 204 through a separate device (not shown) such as a cable modem.

Additionally, the services gateway 202 can provide content to a variety of display devices, including a Digital Living Network Alliance (DLNA) enabled television 208, a DLNA extender 210, a computer 212 equipped with a DLNA client, a mobile device 214 equipped with a DLNA client, or other suitable devices. The DLNA extender 210 can connect to a television 216 that is not DNLA enabled. The services gateway 202 can provide content to the display devices through a local area network (LAN) 218 using an IEEE 802.3 Ethernet protocol, an IEEE 802.11 wireless protocol, a G.hn home networking protocol, a HomePNA home networking protocol, or any combination thereof. The services gateway 202 can provide content to the devices using a common protocol to stream content to the devices, such as in accordance with DNLA Interoperability Guidelines or other suitable interoperability scheme.

The services gateway 202 can be connected to a mass storage module 220. In an alternate embodiment, the mass storage module 220 can be incorporated into the services gateway 202. When VOD content is received from the VOD provider 206 by the services gateway 202, the services gateway can store the VOD content at the mass storage module 220 for later playback. The content can be provided to any of the display devices connected to the LAN 218.

In a particular embodiment, the VOD provider 206 can preposition content at the mass storage module 220. The prepositioned content can include an initial portion of the VOD content or the entire VOD content. Specifically, the VOD provider 206 can provide content to the mass storage device 220 prior to a request by the user. The content may be provided with a license for use. When requested by the user, the services gateway 202 can obtain a license for using the content and can provide immediate access to the content without first needing to retrieve the content. In an embodiment, the VOD provider 206 can preposition content based on popularity, such as prepositioning the 10 most popular titles. In another embodiment, the VOD provider 206 can preposition content based on a user profile, such as prepositioning content recommended for the viewer, such as based on viewing habits or ratings, or specific genres selected by the user, such as Sci-Fi movies.

In an embodiment, the services gateway 202 can be a video processing module for reformatting the content. Specifically, the content can be reformatted to a format appropriate for a particular display device. For example, when the VOD content is being displayed on mobile device 214, the resolution can be reduced, such as from a 1080p HDTV format to a quarter VGA format for display on the mobile device 214, whereas when the content is being displayed on television, such as DLNA-enabled television 208, the content can be provided in a suitable format, such as the 1080p HDTV format. Alternatively, the VOD provider 206 can provide the VOD content in multiple formats.

In another embodiment, the services gateway 202 can include a Digital Rights Management (DRM) module 224. In an example, the DRM module 224 can remove a DRM scheme utilized by the VOD provider and can protect the content with an alternate DRM scheme, such as an open systems standards based DRM scheme, such as Digital Transmission Content Protection over Internet Protocol (DTCP-IP). Additionally, the DRM module 224 can enforce licensing terms for the content. For example, the DRM module 224 can prevent access to prepositioned VOD content without first obtaining a license for the content. Additionally, the DRM module 224 can prevent access to the VOD content after a certain number of views or after a certain time period, such as when the content is rented.

Further details of services gateway 202 can be found in copending U.S. patent application Ser. No. 12/836,679, the disclosure of which is hereby incorporated by reference.

Figure 3:
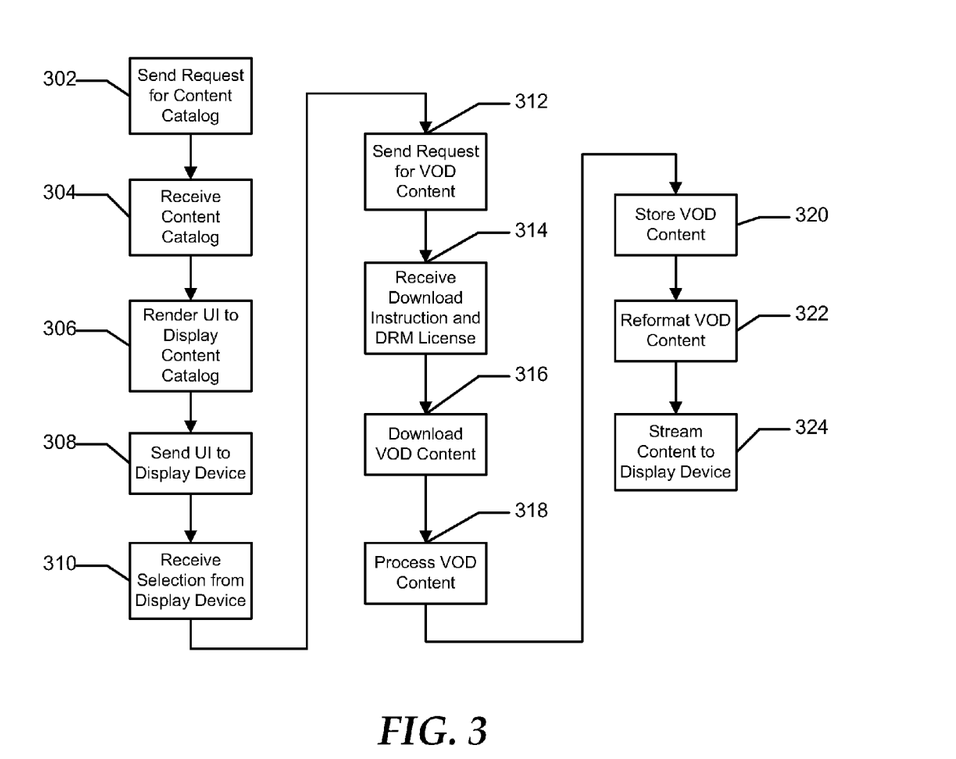
FIG. 3 is a flow diagram illustrating a method of providing on-demand content in accordance with one embodiment of the present disclosure.

FIG. 3 illustrates a method of providing VOD content to a display device. At 302 a services gateway, such as services gateway 202, can send a request for a content catalog. The request can be sent to a VOD provider. The VOD provider can be independent from the Internet Service Provider or real-time television provider accessed by the user, or the VOD provider can be associated with the Internet Service Provider, real-time television provider, or any combination thereof. At 304, the services gateway can receive the content catalog from the VOD provider. The content catalog can be a listing of the VOD content available from the provider. The content catalog can also include pricing information as well as a description of the content. In a particular embodiment, the content catalog can be an XML document.

At 306, the services gateway can render a user interface to display the content catalog. The user interface can present the listing of VOD content available from the VOD provider. In an embodiment, the services gateway can aggregate the content catalogs of multiple VOD providers within the user interface. At 308, the services gateway can send the user interface to a display device, such as DLNA enabled television 208. The display device can display the user interface allowing a user to interact with the user interface to select a VOD content. At 310, the services gateway can receive the selection from the display device. In a particular embodiment, the services gateway can cause the display device to display a confirmation prompt, allowing the user to commit to paying for the VOD content. In an embodiment, the user may purchase or rent the content. In an embodiment, the user can have an account with the VOD provider or can be billed directly by the VOD provider. Alternatively, the billing can be handled by another service provider, such as the Internet Service Provider, the real-time television provider, the services gateway service provider, a third party or any combination thereof.

At 312, the services gateway can send a request for the selected VOD content to the VOD provider. In a particular embodiment, the services gateway can provide the VOD provider with billing information. At 314, the VOD provider can receive a DRM license for the VOD content and download instructions for the VOD content. The download instructions can include a Uniform Resource Locator (URL) for a content server. At 316, the services gateway can download the VOD content from the content server, such as by file transfer or streaming. In an embodiment, the content server can verify the DRM license for the content prior to providing the VOD content to the services gateway. As downloaded, the VOD content can be protected by a DRM scheme to prevent unauthorized access. Specifically, the DRM scheme can limit the use of the VOD content, such as by limiting the users allowed to access the content, the number of times the content can be viewed, the time in which the content can be used, the number of display devices that can be used to access the content, or any combination thereof. In a particular embodiment, the DRM scheme can encrypt the VOD content and the services gateway can use information contained within the license to decrypt the VOD content and comply with limits placed on the use of the content.

At 318, the services gateway can process the VOD stream. For example, the services gateway can remove the DRM scheme used by a VOD provider to protect the VOD content and replace it with a open systems standards based DRM, such as DTCP-IP. In an embodiment, the DRM scheme used by the VOD provider can be a proprietary DRM scheme, such as Microsoft's Mediaroom, Apple's Fairplay, or other proprietary DRM scheme. The services gateway can use the second DRM scheme to enforce the limits placed on the use of the content by the VOD provider with the first DRM scheme. At 320, the services gateway can then store the content on a mass storage device or module. At 322, the services gateway can reformat the VOD content into another VOD stream suitable for delivery to the display device. For example, the services gateway may resample the content to a screen resolution suitable for the display device. Alternatively, when the services gateway obtains the content in multiple formats from the VOD server, the services gateway can select the format appropriate for the display device. At 324, the re-encoded VOD stream can be sent to the display device, and the display device can display the VOD content for the user.

Figure 4:
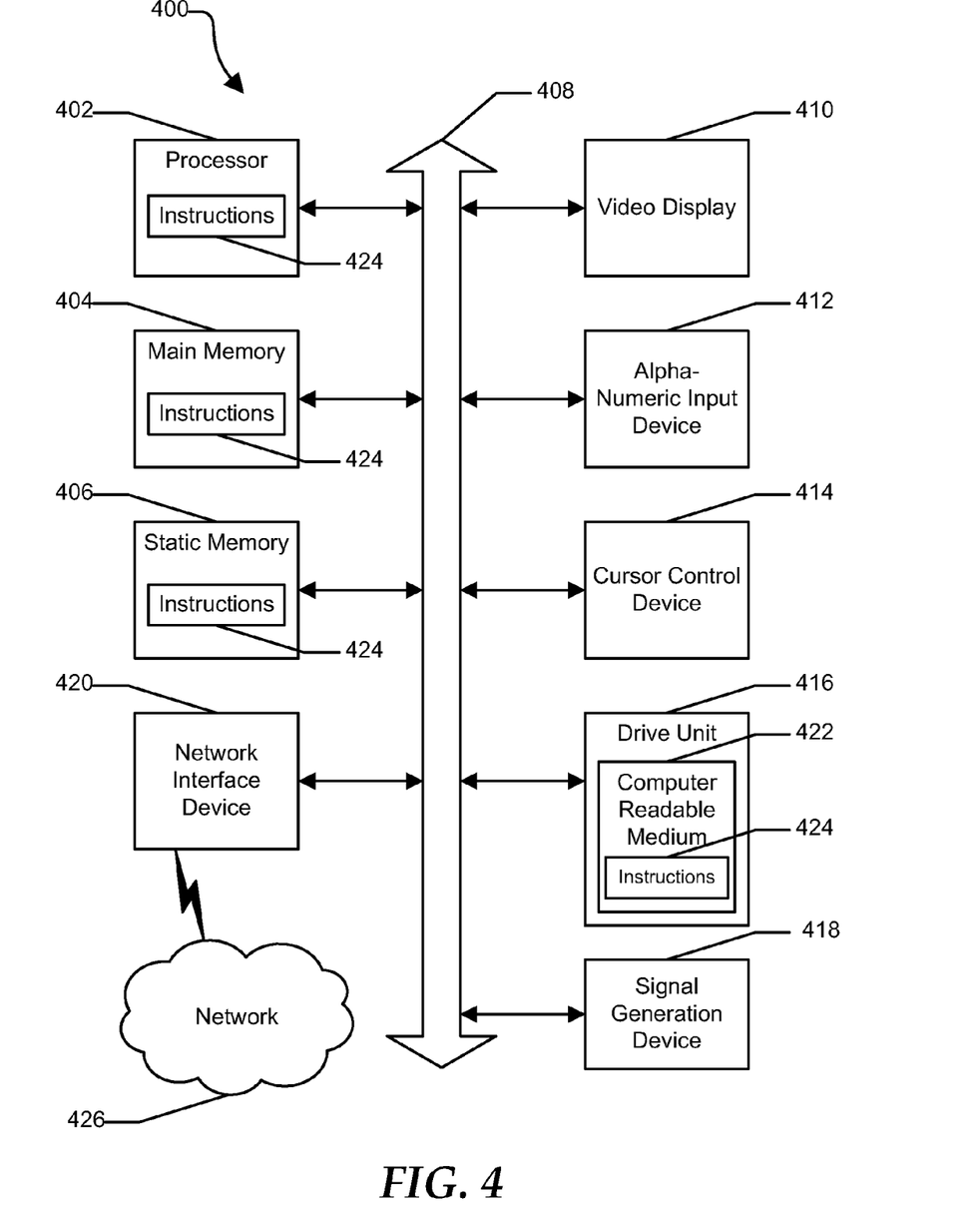
FIG. 4 is an illustrative embodiment of a general computer system.

FIG. 4 shows an illustrative embodiment of a general computer system 400. The computer system 400 can include a set of instructions that can be executed to cause the computer system to perform any one or more of the methods or computer based functions disclosed herein. The computer system 400 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a services gateway, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410 such as a liquid crystal display (LCD), an organic light emitting diode (OLED), a flat panel display, a solid-state display, or a cathode ray tube (CRT). Additionally, the computer system 400 may include an input device 412 such as a keyboard, and a cursor control device 414 such as a mouse. Alternatively, input device 412 and cursor control device 414 may be combined in a touchpad or touch sensitive screen. The computer system 400 can also include a disk drive unit 416, a signal generation device 418 such as a speaker or remote control, and a network interface device 420 to communicate with a network 426. In a particular embodiment, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A services gateway comprising:
a memory to store instructions; and
a processor coupled to the memory, wherein responsive to executing the instructions, the processor performs operations comprising:
sending a first request to a video-on-demand server for a content catalog, wherein the content catalog comprises prepositioned content determined from a popularity of video-on-demand content, a user profile, or viewing habits;
in response to the first request presenting the prepositioned content of the content catalog;
sending a second request for video-on-demand content provided in the prepositioned content of the content catalog;
in response to the second request receiving content data from the video-on-demand content server, wherein the content data comprises the video-on-demand content, wherein the video-on-demand content is protected with a first digital rights management scheme that comprises rules for presenting the video-on-demand content;
processing the content data to retrieve the video-on-demand content;
removing the first digital right management scheme from the video-on-demand content;
encoding the video-on-demand content in a content stream, the content stream protected with a second digital rights management scheme that includes rules conforming to the rules of the first digital rights management scheme, wherein the first digital rights management scheme is formatted differently from the second digital rights management scheme; and
providing the content stream over a local area network to a playback device.

2. The services gateway of claim 1, comprising a mass storage to store the video-on-demand content, wherein the processor further performs operations comprising storing the video-on-demand content in the mass storage.

3. The services gateway of claim 1, wherein the presenting comprises:
rendering the prepositioned content of the content catalog at the playback device; and
receiving a selection of the video-on-demand content from the playback device, wherein sending the second request is responsive to receiving the selection.

4. The services gateway of claim 3, wherein the processor further performs operations comprising receiving the content catalog from equipment of a service provider, the content catalog including a list of content available from the service provider.

5. The services gateway of claim 1, wherein the processor further performs operations comprising receiving a license to distribute the video-on-demand content and instructions from the service provider in response to sending the second request.

6. The services gateway of claim 1, wherein the local area network utilizes a protocol comprising one of an ethernet protocol, a wireless protocol, a home powerline networking protocol, a coaxial home networking protocol, or any combination thereof, and wherein the services gateway communicates with the video-on-demand content server using a communication network comprising one of a cable television network, an internet protocol television network, a direct broadcast satellite network, a telephone network, a cellular network, a wireless network, or any combination thereof.

7. The services gateway of claim 1, wherein the playback device comprises one of a television, a computer, or a mobile device.

8. The services gateway of claim 1, wherein the content stream conforms to a digital living network alliance protocol.

9. A non-transitory computer readable storage device, comprising instructions to manipulate a processor, wherein execution of the instructions by the processor causes the processor to perform operations comprising:
obtaining a license for video-on-demand content;
receiving content data, the content data including the video-on-demand content protected with a first digital rights management scheme that comprises rules for presenting the video-on-demand content;
processing the content data to retrieve the video-on-demand content;
removing the first digital right management scheme from the video-on-demand content to generate updated video content;
encoding the video-on-demand content in a content stream, the content stream protected with a second digital rights management scheme that comprises rules similar to the rules of the first digital rights management scheme, wherein the first digital rights management scheme is formatted differently from the second digital rights management scheme; and
providing the content stream over a local area network to a playback device;
rendering a user interface displaying prepositioned content of a content catalog, wherein the prepositioned content is determined from a popularity of video-on-demand content, a user profile, or viewing habits; and
receiving a selection of the video-on-demand content from the playback device, wherein obtaining the license is responsive to receiving the selection.

10. The non-transitory computer readable storage device of claim 9, wherein the processor further performs operations comprising receiving the content catalog from equipment of a service provider.

11. The non-transitory computer readable storage device of claim 9, wherein obtaining the license comprises receiving the license from equipment of a service provider in response to receiving a request for the video-on-demand content.

12. The non-transitory computer readable storage device of claim 9, wherein the local area network utilizes a protocol comprising one of an ethernet protocol, a wireless protocol, a phone line networking protocol, a coaxial home networking protocol, or any combination thereof, and wherein receiving the content data comprises communicating with a video-ondemand content server using a communication network comprising one of a cable television network, an internet protocol television network, a direct broadcast satellite network, a telephone network, a cellular network, a wireless network, or any combination thereof.

13. The non-transitory computer readable storage device of claim 9, wherein the playback device comprises one of a television, a computer, or a mobile device.

14. A method comprising:
   sending, by a system comprising a processor, a request for video-on-demand content;
   receiving, by the system, content data from a video-on-demand content server, wherein the content data comprises the video-on-demand content, and wherein the video-on-demand content is protected with a first digital rights management scheme;
   processing, by the system, the content data to retrieve the video-on-demand content;
   removing, by the system, the first digital right management scheme from the video-on-demand content;
   encoding, by the system, the video-on-demand content in a content stream, wherein the content stream is protected with a second digital rights management scheme, and wherein the first digital rights management scheme is formatted differently from the second digital rights management scheme; and
   providing, by the system, the content stream over a local area network to a playback device;
   rendering a user interface displaying prepositioned content of a content catalog, wherein the prepositioned content is determined from a popularity of video-on-demand content, a user profile, or viewing habits; and
   receiving a selection of the video-on-demand content from the playback device, wherein sending the request is responsive to receiving the selection.

15. The method of claim 14, further comprising reformatting the video-on-demand content based on a resolution of the playback device.

16. The method of claim 14, further comprising receiving the content catalog from equipment of a service provider.

17. The method of claim 14, further comprising receiving a license to use the video-on-demand content and instructions from equipment of a service provider in response to sending the request.

18. The method of claim 14, wherein the playback device comprises one of a television, a computer, or a mobile device.

\* \* \* \* \*